United States Patent
Axelrod et al.

(10) Patent No.: US 6,274,182 B1
(45) Date of Patent: Aug. 14, 2001

(54) ANIMAL CHEW

(75) Inventors: Glen S. Axelrod; Ajay Gajria, both of Neptune City, NJ (US)

(73) Assignee: TFH Publications, Inc., Neptune City, NJ (US)

( * ) Notice: Subject to any disclaimer, the term of this patent is extended or adjusted under 35 U.S.C. 154(b) by 0 days.

(21) Appl. No.: 09/443,590

(22) Filed: Nov. 19, 1999

(51) Int. Cl.⁷ .................................................. A01K 29/00
(52) U.S. Cl. ..................... 426/132; 426/661; 426/805; 527/47; 528/332
(58) Field of Search .................... 426/805, 132, 426/661; 528/332; 527/47

(56) References Cited

U.S. PATENT DOCUMENTS

| | | | |
|---|---|---|---|
| 3,871,334 | 3/1975 | Axelrod | 119/29.5 |
| 4,373,085 * | 2/1983 | Bolze et al. | 528/291 |
| 4,513,014 | 4/1985 | Edwards | 426/132 |
| 4,557,219 | 12/1985 | Edwards | 119/29.5 |
| 4,663,428 * | 5/1987 | Okitu et al. | 528/324 |
| 4,771,773 | 9/1988 | Kropf | 128/303 |
| 4,985,964 | 1/1991 | Lawson | 452/135 |
| 5,007,879 | 4/1991 | Lawson | 452/198 |
| 5,149,550 | 9/1992 | Mohilef | 426/3 |
| 5,200,212 | 4/1993 | Axelrod | 426/2 |
| 5,240,720 | 8/1993 | Axelrod | 426/2 |
| 5,407,661 | 4/1995 | Simone et al. | 424/49 |
| 5,419,283 * | 5/1995 | Leo | 119/709 |
| 5,476,069 | 12/1995 | Axelrod | 119/709 |
| 5,485,809 * | 1/1996 | Carroll | 119/710 |
| 5,635,237 | 6/1997 | Greenberg et al. | 426/646 |
| 5,750,196 | 5/1998 | Welch | 427/290 |
| 5,771,254 | 6/1998 | Baldwin et al. | 372/31 |
| 5,786,383 | 7/1998 | Clement | 514/633 |
| 5,827,565 | 10/1998 | Axelrod | 426/623 |
| 5,844,023 * | 12/1998 | Tomka | 527/47 |
| 5,912,285 * | 6/1999 | Godsey | 524/17 |
| 6,067,941 * | 5/2000 | Axelrod | 119/707 |
| 6,111,058 * | 8/2000 | Warzelhan et al. | 528/332 |

FOREIGN PATENT DOCUMENTS

| | | | |
|---|---|---|---|
| 289824 | 6/1995 | (NZ) | C08G/69/44 |
| 96/21689 * | 7/1996 | (WO) . | |

OTHER PUBLICATIONS

"Microcell Limited and Others' Application" Dixon et al Fleet Street Patent Law Reports; 1977; pp. 163–164.

* cited by examiner

Primary Examiner—Chhaya D. Sayala
(74) Attorney, Agent, or Firm—Hayes, Soloway, Hennessey, Grossman & Hage, PC

(57) ABSTRACT

An biodegradable animal chew made from polyesteramide and starch is disclosed. In addition, a method of forming such a biodegradable animal chew is disclosed wherein the polyesteramide component forms distinct continuous domains dispersed within a continuous starch phase.

14 Claims, No Drawings

ANIMAL CHEW

FIELD OF THE INVENTION

The present invention relates to a biodegradable animal chew, and a process for forming such a biodegradable chew toy from a polyesteramide and starch.

BACKGROUND OF THE INVENTION

In U.S. Pat. No. 5,827,565 it is pointed out that most dogs enjoy chewing on a flavored object although preferences vary as to the hardness. Some dogs like to chew on very hard materials such as cow bones, wood, nylon, while others prefer softer chews such as polyurethane or rubber while still others favor freeze dried snacks. Some dogs, due to their age, may not be able to chew on very hard substances. Young dogs have insufficiently developed teeth, while old dogs may have diseased gums or may have lost some of their teeth.

Applicants' assignee, T.F.H. Publications Inc., has previously developed an edible dog chew that is wholly digestible, nutritious and maintains a texture or hardness which is individually adjustable by the application of heat to suit a wide variety of a dog's preferences or needs. Such dog chews utilize a mixture containing primarily casein and are described in U.S. Pat. Nos. 5,200,212 and 5,240,720.

In U.S. Pat. No. 5,827,565 owned by the common assignee of this Application there is disclosed a process for making a heat expandable dog chew comprised primarily of injection molding potato starch granules and an attractant. Attractants recited include chicken powder, liver powder, ham, turkey, beef and or fish. Natural vegetable additives such as spinach or carrots also may be added. The resultant mixture is molded under heat and pressure into a desired form, such as a dog bone. The dog bone so produced can be modified in texture or hardness by subsequent heating, preferably in a microwave oven.

In U.S. patent application Ser. No. 09/138,804, which is a continuation-in-part of U.S. Pat. No. 5,827,565, and which is owned by the common assignee of this Application, there is disclosed a dog chew having natural fruit flavor to increase the dog's appetite for such chew. Such fruit flavored dog chew may also include natural food coloring to enhance the attractiveness of the chew to the dog owner. The food coloring may also correspond to the fruit flavor, and the dog chew disclosed therein may also embody a breath sweetener for a dog such as mint, spearmint, peppermint or wintergreen and may also include parsley. The preferred form of such edible chew maintained the basic ingredient of a heat-expandable starch, such as potato starch. Fruit flavoring may be added to the granules of a mixture of potato starch, water and calcium carbonate along with natural fruit flavorings.

Attention is also directed to the following U.S. Patents and copending applications, commonly owned by the assignee herein: U.S. Pat. No. 5,476,069; U.S. patent application Ser. No. 08/923,070 filed Sep. 3, 1997 entitled "Vegetable Based Dog Chew" now U.S. Pat. No. 6,093,427; Ser. No. 08/738,423 filed Oct. 25, 1997 entitled "Edible Dog Chew" now U.S. Pat. No. 5,827,565; Ser. No. 08/784,834 filed Jan. 17, 1997 entitled "Carrot-Based Dog Chew" now U.S. Pat. No. 5,941,197; Ser. No. 08/888,611 filed Jul. 7, 1997 entitled "Vegetable Dog Chew" now abandoned; Ser. No. 09/114,872 filed Jul. 14, 1998 entitled "Heat Modifiable Edible Dog Chew" now U.S. Pat. No. 6,180,161; Ser. No. 09/138,804 filed Aug. 21, 1998 entitled "Improved Edible Dog Chew" now U.S. Pat No. 6,126,978; Ser. No. 09/116,070 filed Jul. 15, 1998 entitled "Wheat & Casein Dow Chew With Modifiable Texture" now U.S. Pat. No. 6,110,521; Ser. No. 09/116,555 filed Jul. 15, 1998 entitled "Heat Modifiable Peanut Dog Chew" now U.S. Pat. No. 6,093,441; Ser. No. 09/227,767 filed Jan. 8, 1999 entitled "Method of Molding Edible Starch" now U.S. Pat. No. 6,159,516. In addition to such patents and applications, attention is also directed to the art cited in said patents and applications, as such art relates to the field of molded starch products.

In addition, the prior art has recently grown considerably to include a variety of other disclosures directed at flavored pet products. For example, U.S. Pat. No. 5,786,383 entitled "Use of Valerian Plant and/or Root as a Scent-Attractant for Stimulating Canines and Felines". This patent discloses the use of the herb/plant Valerian in all of its forms whether whole or in part, for use in food product, in such a manner that the natural aroma emitted by the Valerian plant will act as a scent/attractant for dogs and cats.

U.S. Pat. Nos. 4,985,964 and 5,007,879 entitled "Dog Chew Processing Method" disclose methods for processing cattle hoofs for use as a dog chew product.

U.S. Pat. No. 5,149,550 entitled "Methods for Making Pet Chews" discloses that ligaments from cattle and other hoofstocks are rendered substantially free of fat and can be dried and hardened for use as a pet chew.

U.S. Pat. No. 5,407,661 entitled "Pet Chew Product Having Oral Care Properties" discloses an edible pet chew product having a flexible cellular matrix in which is contained cellulosic fibrous material such as corn cob fractions which are described as having a mechanical cleansing function when chewed by a pet.

U.S. Pat. No. 5,635,237 entitled "Method of Manufacturing Substantially Pure Rawhide Pet Products" discloses a chew of pure rawhide utilizing twin screw extrusion with multiple heating zones and interchangeable extrusion dies.

U.S. Pat. No. 5,711,254 entitled "Dog Chew Toy" discloses a chew toy for dogs formed of a length of composite rope having an inner core defined by strands of twisted threads of natural plant or synthetic fibers and a soft outer shell defined by a plurality of strands of soft cotton threads twisted about the inner core. The inner core is said to be less water absorbent than the outer shell to promote drying of the toy when wetted with dog saliva to inhibit bacteria growth.

U.S. Pat. No. 5,750,196 entitled "Process for Manufacturing Dog Chew Toys of Tire Sidewalls" discloses the use of a dye to cut toy bases from sidewalls recovered from used tires.

Other earlier examples of such products are disclosed in U.S. Pat. No. 3,871,334 to Axelrod (nylon substrate containing liquid flavor and odor components) and U.S. Pat. No. 4,711,773 to Axelrod (polyurethane toy containing aqueous-based flavor and odor components). U.S. Pat. Nos. 4,557,219 and 4,513,014 to Edwards disclose the use of flavorings in a molded polyurethane chew objects.

Accordingly, it is an object herein to improve further upon Applicants' earlier disclosures regarding animal chews, to form a biodegradable animal chew from a thermoplastic polyesteramide and starch. Furthermore, it is also an object of the present invention to form a biodegradable animal chew wherein the polyesteramide component is present in distinct domains dispersed within a continuous starch phase.

SUMMARY OF THE INVENTION

An improved biodegradable animal chew comprising a thermoplastic biodegradable polyesteramide and starch. In a second embodiment, a process for forming such a biodegradable animal chew is disclosed.

Detailed Description Of The Preferred Embodiments

The present invention comprises a biodegradable animal chew formed from a polyesteramide and starch. Polyesteramides are polymers containing both ester linkages and amide linkages. The biodegradability of such polymers arises from the susceptibility of their ester linkages to hydrolysis. On the other hand, the amide linkages of such polyesteramides confer desirable mechanical properties characteristic of more conventional polyamides, i.e. nylons. Nylon refers to a family of high strength, resilient synthetic materials, the long chain of which contains recurring amide groups.

The polyesteramides used in this invention can be prepared from the reaction of one or more dicarboxylic acids of formula I, with one or more glycols of formula II and one or more diamines of formula III:

$$HOOC-R_1-COOH \qquad I$$

$$HO-R_2-OH \qquad II$$

$$H_2N-R_3-NH_2 \qquad III$$

in which $R_1$, $R_2$, and $R_3$ may be identical or different and are selected from the group consisting of linear aliphatic, cycloaliphatic, aromatic, and araliphatic. Where $R_1$, $R_2$, and $R_3$ comprise divalent aliphatic and/or cycloaliphatic groups, the resulting polyesteramides are generally referred to as aliphatic polyesteramides. On the other hand, where $R_1$, $R_2$, or $R_3$ comprise, in part, divalent aromatic and/or araliphatic groups, the resulting polyesteramides are generally referred to as mixed aliphatic/aromatic polyesteramides. Where $R_1$, $R_2$, and $R_3$ substantially comprise divalent aromatic moieties, the resulting polyesteramides are generally referred to as aromatic polyesteramides. U.S. Pat. Nos. 4,081,428 and 4,474,936 describe methods to prepare polyesteramides from dicarboxylic acids, gycols, and diamines, whose teachings are incorporated herein by reference.

Alternatively, polyesteramides used in the present invention can be formed from the reaction of dicarboxylic acids of formula I and hydroxylamines of formula IV:

$$H_2N-R_4-OH \qquad IV$$

in which $R_4$ is selected from the group consisting of linear aliphatic, cycloaliphatic, aromatic, and araliphatic. U.S. Pat. No. 4,373,085 describes methods to prepare polyesteramides from dicarboxylic acids, diamines, and hydroxylamines, whose teachings are incorporated herein by reference.

Polyesteramides used in the present invention can also be prepared from reaction of aminocarboxylic acids, lactams, and/or nylon salts with various diols, including polycaprolactonediols. U.S. Pat. No. 4,663,428 describes methods to prepare polyesteramides from aminocarboxylic acids, lactams, nylon salts and diols, whose teachings are incorporated herein by reference.

Preferred polyesteramides for use in the present invention are commercial materials sold by Bayer under the trademark "BAK." Bayer's product BAK 404-004 is a semicrystalline, largely transparent, aliphatic, biodegradable thermoplastic material. BAK 404-004 has a DSC melting point of 137° C.

The starch used in the present invention is a natural material extracted from various plants such as corn, potato, tapioca, and cereals. Starches are polysaccharide compounds which on hydrolysis produce sugars. Starch can include a mixture of linear components generally referred to as amylose, and branched components generally referred to as amylopectin. Amylose generally has a molecular weight of several hundred thousand, while amylopectin generally has a molecular weight in the order of several million. Starches containing 0 to 100% amylose or 0 to 100% amylopectin can be employed in the invention.

As used herein, starch should be understood to preferably include starches with a high amylopectin content sometimes called waxy starches, as well as chemically and physically modified starches, such as for example starches whose acid values have been reduced, starches in which the type and concentration of cations associated with the phosphate groups have been modified, ethoxylated starches, starch acetates, cationic starches, oxidated starches and cross-linked starches.

Use of a potato starch product sold under the trademark PARAGON 1010 IM by AVEBE of Veendam, The Netherlands, is preferred. The PARAGON 1010 IM is sold in the form of thermoplastic granules.

The polyesteramide component of the present invention can be made present between about 0–99% by weight based upon the weight of starch used. Preferably, 1–50% (wt), 1–40% (wt) and 1–30% (wt) of polyesteramide is combined with starch to form the mixtures herein. Most preferably, 10–30% polyesteramide (wt) is employed, and in a most preferably embodiment 15–25%. The polyesteramide component is preferably dry mixed with the starch component, and that mixture is then molded into a desired shape.

As those skilled in the art will appreciate, an injection molding apparatus, which is one preferred mixing apparatus, typically contains a hopper feed section, a barrel, and an output nozzle, including a plurality of heating zones in the barrel extending from the hopper section to the nozzle. In accordance with the present invention, it has been found preferable to maintain the temperature in the first zone adjacent to the hopper at a temperature of less than about 150° F. More preferably, the first zone adjacent to the hopper is set in the range of about 45–150° F. In an even more preferred embodiment, i.e. that situation wherein there is a first zone adjacent to the hopper, and a second zone adjacent to that first zone, the temperature of the first zone is set to between about 45–70° F., and the temperature of the second zone is set to between about 70–150° F. These temperatures are most conveniently achieved by use of cooling coils placed about the barrel of the injection molding apparatus. These cooling coils are preferably made from copper tubing, and are cooled with circulating water.

In a particularly preferred embodiment, the following temperature profile is used to mold the polyesteramide/starch composition of the present invention: Zone 4 (closest to hopper)=45–70° F.; Zone 3=70–150° F.; Zone 2=150–300° F.; Zone 1=275–375° F.; Nozzle=275–390° F. In addition, the bushing inside the mold is preferably set to about 325–425° F. The mold temperature is preferably set at 35–65° F.

As opposed to a more conventional practice of heating the barrel of the screw to melt the material in the zones proximate to the hopper, the temperature profile set forth above results in cooling the barrel in those zones thereby preventing overheating and burning of the polyesteramide/starch mixture. In addition, use of this temperature profile does not result in a thorough melt based intermixing of the polyesteramide component with the starch component. Rather, the molded polyesteramide/starch article contains discrete polyesteramide domains dispersed within a continuous starch phase. In the context of the present invention, such discrete polyesteramide domains may be visually distinct from the continuous starch phase, or readily viewable via optical microscopy.

As those skilled in the art will appreciate, the product may be molded into any of a variety of shapes, including a bone, rod, ring, disk, and the like. Accordingly, in broad aspects, although injection molding is preferred, any other type of molding process is contemplated. For example, the polyesteramide/starch composition of the present invention is suitable for compression molding as well as other thermoplastic processing techniques available in the art. In that regard, the herein starch/polyesteramide mixture can be prepared by extrusion techniques.

In accordance with the present invention, flavorings may optionally be added to the polyesteramide/starch composition during the molding process. Natural flavorings are preferred. As will be appreciated by those skilled in the art, such flavorings may comprise both powders and liquids. The weight content of such fruit flavorings in the animal chew of the present invention may be preferably between about 0.1 weight percent and about 5.0 weight percent, but preferably fall in the range of 0.25–1.0 weight percent.

In addition, a food coloring may be added to the polyesteramide/starch mixture prior to molding to enhance the attractiveness of the chew. A natural food coloring is preferred. The weight content of such food coloring in the present invention may preferably be between about 0.05 weight percent and about 10 weight percent. More preferably, food coloring is set between 0.1–1.0 weight percent.

A fragrance may also be added to the polyesteramide/starch mixture prior to molding. The weight content of such a fragrance in the present invention may preferably be between about 0.1 weight percent and about 5.0 weight percent. In that regard, a preferred fragrance would include teatree oil.

The following examples are presented to further illustrate to persons skilled in the art how to make and use the invention and to identify presently preferred embodiments thereof. These examples are not intended as limitations, however, upon the scope of the invention, which is defined only by the appended claims.

EXAMPLE 1

In this Example, 5 pounds of BAK 404-004 were mixed with 30 pounds of PARAGON 1010 IM. To this mixture was added 1.5 ounces of a red food coloring, and 0.25 pounds of liver powder. The BAK 404-004/PARAGON 1010 IM/red food coloring/liver powder mixture was injection molded using the preferred molding parameters discussed above to produce a molded, biodegradable animal chew having about 14.28% (wt) polyesteramide dispersed in visually discrete domains within a continuous starch matrix.

EXAMPLE 2

In this Example, 10 pounds of BAK 404-004 were mixed with 25 pounds of PARAGON 1010 IM. To this mixture was added 1 ounce of a green food coloring and 0.25 pounds of liver powder. The BAK 404-004 /PARAGON 1010 IM/green food coloring/liver powder mixture was injection molded using the molding parameters discussed above to produce a molded, biodegradable animal chew having about 28.69% (wt) polyesteramide dispersed in visually discrete domains within a continuous starch matrix.

EXAMPLE 3

In this Example, 15 pounds of BAK 404-004 were mixed with 20 pounds of PARAGON 1010 IM. To this mixture was added 1.0 pounds of an orange food coloring. The BAK 404-004 /PARAGON 1010 IM/green food coloring mixture was injection molded using the molding parameters discussed above to produce a molded, biodegradable animal chew having about 43% (wt) polyesteramide dispersed in visually discrete domains within a continuous starch matrix.

What is claimed is:

1. A method of forming a biodegradable animal chew, comprising the steps of:
   supplying a polyesteramide;
   supplying starch;
   mixing said polyesteramide and said starch and introducing said mixture to a mixing and molding apparatus wherein said apparatus comprises a hopper feed section, a barrel, an output nozzle, and a plurality of heating zones in said barrel extending from said hopper section to said nozzle and wherein said heating zones are set to temperatures that do not result in a thorough melt intermixing of the polyesteramide component with the starch component such that upon molding said polyesteramide/starch mixture into said animal chew said molded article comprises discrete polyesteramide domains within a continuous starch domain.

2. The method of claim 1, wherein said polyesteramide is selected from the group consisting of an aliphatic polyesteramide, a mixed aliphatic/aromatic polyesteramide, an aromatic polyesteramide, and a mixture thereof.

3. The method of claim 1, wherein said starch is selected from the group consisting of corn starch, potato starch, tapioca starch, and a mixture thereof.

4. The method of claim 1, wherein said starch comprises extruded potato starch in the form of granules.

5. The method of claim 1 wherein said plurality of heating zones comprise four heating zones which are set within the following temperature ranges:
   zone 1=at or below 70° F.;
   zone 2=at or below 150° F.;
   zone 3=at or below 300° F.;
   zone 4=at or below 375° F.

6. The method of claim 1 wherein said mixing and molding apparatus is an injection molding machine.

7. The method of claim 1 wherein said polyesteramide is present between about 1–50% by weight.

8. The method of claim 1 wherein said polyesteramide is present between about 1–40% bad weight.

9. The method of claim 1 wherein said polyesteramide is present between about 1–30% by weight.

10. The method of claim 1 wherein said polyesteramide is present between about 10–30% by weight.

11. The method of claim 1 wherein said polyesteramide is present between about 15–25% by weight.

12. The method of claim 1, wherein said mixture of said polyesteramide and starch further comprises a food coloring, wherein said food coloring is present between about 0.1 weight percent to about 5 weight percent based upon the weight of the polyesteramide/starch mixture.

13. The method of claim 1 wherein said mixture of polyesteramide and starch further comprises a flavoring selected from the group consisting of a liquid flavoring, a powdered flavoring, and a mixture thereof, wherein said flavoring is present between about 0.1 weight percent to about 5.0 weight percent based upon the weight of the polyesteramide/ starch mixture.

14. The method of claim 1 wherein said chew toy comprises the shape of a bone, a disk, a rod, or a ring.

* * * * *